2,831,851

POLYSULFURIC ACID ESTERS OF N-FORMYL CHITOSAN

Karl Vogler, Basel, Switzerland, assignor to Hoffmann-La Roche Inc., Nutley, N. J., a corporation of New Jersey No Drawing. Application January 6, 1955
Serial No. 480,299

Claims priority, application Switzerland January 22, 1954

13 Claims. (Cl. 260—211)

This invention relates to polysulfuric acid esters of chitosan and to a method for producing those substances. More particularly, this invention relates to a method for making readily reproducible polysulfuric acid esters of chitosan in good yields.

It has been found that polysulfuric acid esters of chitosan of reproducible molecular weight range may be easily prepared if the chitosan is converted into one of its salts prior to sulfation. The salt of chitosan may also be degraded to a lower degree of polymerization. By forming a salt of chitosan as a first step according to this invention, degradation is also easily effected to the desired degree and reproducible products are readily obtained. So long as the chitosan is first converted into a salt thereof, the degradation and sulfation steps may be carried out in optional sequence. By the present method of first forming a salt of chitosan the processing of chitosan proceeds homogeneously and with ease, so that the desired degree of sulfation and degradation is easily attained and a consistently reproducible finished product of any degree of polymerization may be attained.

The chitosan polysulfuric acid esters of the present invention are blood anticoagulants having activity related to that of heparin. The products are therefore useful in therapy where the anticoagulant activity of heparin is utilized. In addition, low molecular weight fractions of chitosan polysulfuric acid esters prepared according to the present invention are useful in the clarification of lipenic plasma.

According to the present invention, commercially available carbonate-free chitin is treated with fused alkali and deacetylated (Lowy, Biochem. Zeitschrift, 23, page 47 [1910]; Disertation Bruno Camerino, Zurich, 1945, page 36). The chitosan thus obtained is freed of alkali and is dissolved in an aqueous monovalent acid containing the desired salt forming anion. To the acid solution is added a water-miscible precipitating agent, such as acetone, ethanol or methanol, and the salt of chitosan which precipitates is separated from the solution.

The salts of chitosan which are employed in the present invention are salts of chitosan and organic or inorganic monovalent acids. Preferred salts are the formate, acetate, perchlorate, nitrate, hydrochloride or hydrobromide.

According to one modification of this invention the chitosan salt is sulfated by dissolving it in a solvent, such as formamide, and the solution is treated with chlorosulfonic acid while cooling and stirring thoroughly.

The chitosan polysulfuric acid esters produced in this manner show a relatively high content of free amino groups which may be characterized by analysis for nitrogen according to the method of Van Slyke. The amino nitrogen content is especially high when chitosan salts of strong acids, for example the hydrochloride or the perchlorate, are treated with chlorosulfonic acid.

According to another modification, the solution of the salt of chitosan in formamide may be introduced into a hot mixture of pyridine and chlorosulfonic acid and the sulfation reaction is carried out at a temperature between 20 and 100° C. Products obtained according to this modification generally have a high amount of total nitrogen but a low amount of free amino groups. According to the foregoing method, it is also possible to regulate as desired the free amino group content of the final product by utilizing salts of strong acids and variable amounts of pyridine.

The products obtained according to this method are formylated on the amino groups to a greater or lesser degree. Compounds with many free amino groups are formylated to a slight degree and conversely compounds with a few free amino groups are formylated to a proportionately higher degree. In this manner, the control of the degree of formylation may be effected by means of the foregoing method, for example, sulfating salts of chitosan with strong acid with or without pyridine, or sulfating salts of chitosan with weak acids with or without pyridine. The smallest formyl content (e. g. about 1.5% formyl) is obtained, for example, by sulfating chitosan hydrochloride without pyridine. The highest formyl content (e. g. about 9% formyl) may be obtained by sulfating chitosan formate with pyridine.

The amount of sulfur in the end product is dependent upon the quantity of chlorosulfonic acid used, as well as the time and temperature at which the sulfation is effected. Variations in the conditions of operation outlined above permit a relatively wide latitude in determining the nature of the product as desired.

If it is desired to obtain end products of a reduced degree of polymerization, a degradation stage may be undertaken, for example, by treating the salt of chitosan with aqueous hydrogen peroxide or by hydrolysis by means of acids or alkalis, either before or after the sulfation step. The chitosan salts lend themselves to such a degradation step so that end products of the desired reduced degree of polymerization in comparison with the starting material are obtained with facility.

The anticoagulant activity of the final product is a function of the degree of polymerization and of the sulfur content. For those chitosan polysulfuric acid esters intended for application as anticoagulants, a product is selected having a high degree of polymerization and a relatively high sulfur content, for example $[\eta]=0.315$, $S=$about 15%. Chitosan polysulfuric acid esters of a low degree of polymerization, for example $[\eta]=0.072$, display a low anticoagulant activity, but show a good ability to clarify the lipemic plasma.

The degradation is preferably carried out by treating either a salt of chitosan or its sulfation product with hydrogen peroxide. The conditions under which the procedure is carried out determine the charcteristics of the end product. By varying the amount of peroxide and the time and temperature of reaction, varying degrees of degradation are achieved. Similarly, the degradation may be accomplished hydrolytically by treatment with acid or alkali. A further possibility which influences the chain length depends principally on the variation of the temperature of sulfation. Generally, the higher the temperature of sulfation selected, the greater is the degree of degradation which occurs.

The degree of degradation of the polymerizate is characterized viscosimetrically by means of the intrinsic viscosity $[\eta]$. The intrinsic viscosity $[\eta]$ is defined as follows:

$$[\eta] = \lim_{c \to 0} \frac{\eta_{spec}}{c}$$

where:

$$\eta_{spec} = \frac{\eta_L - \eta_0}{\eta_0} = \eta_{rel} - 1$$

$\eta_L=$Viscosity of the solution
$\eta_0=$Viscosity of the solvent
$c=$Concentration in grams per 100 cc.

The limiting value of [η] is determined graphically at various concentrations, for example by plotting $$\frac{\eta_{spec}}{c}$$

against $c$. The viscosity measurements are determined at 25° C. by means of an Ostwald viscosimeter.

The chitosan polysulfuric acid esters obtained according to the present invention are polydisperse by nature. Particularly when a step of degradation is introduced, it is suitable before or after sulfation, especially after the degradation, to fractionate the product and to select that fraction which will display the desired properties when converted into the final product. This is accomplished by fractionating chitosan in the form of its salt or the chitosan polysulfuric acid esters preferably in the form of the alkali metal salt. The polydisperse material is dissolved in water and treated with varying amounts of a water-miscible precipitating agent, e. g. methanol, ethanol, acetone, etc., whereby that portion of the polymerizate of higher or lower molecular weight precipitates out and is separated. The precipitation of the high molecular weight portion requires a small amount of precipitating agent; for precipitation of the low molecular weight portions, a greater amount of precipitating agent is required. In order to produce chitosan polysulfuric acid esters having high anticoagulant activity, the low molecular weight portion is separated. In order to obtain chitosan polysulfuric acid esters which clarify lipemic plasma, the higher molecular weight portion should be removed.

The chitosan polysulfuric acid ester, after the desired degree of degradation, is further processed by reprecipitating with methanol, preferably containing sodium acetate, or with another suitable precipitating agent, such as ethanol, acetone, etc. Preferably the product is further purified by converting the precipitate thus obtained into an alkaloid salt and then reconverting the purified substance into the free ester or its alkali metal salt according to the following procedure. The precipitate is washed with the precipitating agent, dissolved in a little water, and the pH is adjusted to about 9 with an alkali, such as sodium hydroxide. This solution of the crude alkali metal salt is again treated wtih methanol, containing sodium acetate if necessary, to precipitate the salt. The precipitate is again dissolved in water, treated with ice and then converted into an alkaloid salt, such as the narcotine salt, by treating with a concentrated solution of an appropriate alkaloid salt, e. g. narcotine hydrochloride. The alkaloid salt is isolated by centrifuging or filtering, thoroughly washed with water and converted again to the alkali metal salt by introduction into a soda solution either at room temperature or a slightly higher temperature. The alkali metal salt is separated from the alkaloid, thoroughly washed and neutralized with glacial acetic acid. The solution is concentrated if necessary and then is treated with methanol or another water-miscible precipitating agent to precipitate the alkali metal salt. The precipitation may be repeated if desired for the purpose of further purification or fractionation.

The degradation and sulfation treatments are readily controlled as described above and give reproducible results when the chitosan starting material is converted initially to a salt of a monovalent acid.

The chitosan polysulfuric acid esters are preferably utilized in the form of their alkali metal salts.

*Example 1*

Chitosan was dissolved in dilute formic acid. The viscous solution was treated with acetone whereupon a precipitate formed. The precipitate was filtered by suction, dried and pulverized. The chitosan formate obtained was very water soluble, $[\eta]=1.04$.

In order to degrade the chitosan formate, 100 grams were dissolved in 1 liter of water while warming on a steam bath. The solution was treated with 25 cc. of 30% perhydrol and warmed for 2 hours at 70° C. while stirring. After this period the peroxide was consumed. The mixture was then filtered and evaporated in vacuo to 450 cc. This concentrate was then treated with 3 liters of acetone while stirring. The precipitate which formed was separated by decanting off the aqueous acetone solution. In order to harden the substance, 500 cc. of fresh acetone was poured onto the precipitate. After standing awhile the product was filtered by suction and dried, $[\eta]=0.190$.

The degraded chitosan was sulfated by dissolving 90 grams of the material in 900 cc. of formamide warmed to 50° C. The solution was cooled with ice water and 180 cc. of chlorosulfonic acid was slowly dropped in at about 10° C. Finally, to complete the reaction, the mixture was stirred at room temperature overnight. The mixture was filtered under suction through filter cellulose. The filtrate was stirred with 3 liters of methanol containing 120 grams of sodium acetate in solution and a precipitate formed. The precipitate, after separation, was dissolved in a little water, the pH was adjusted to 9 with concentrated alkali and again precipitated with methanol. The crude sodium salt formed in this manner was dissolved in 1.5 liters of water and 500 grams of ice were added. The mixture was treated, while stirring, with a solution of 280 grams of narcotine hydrochloride in 1 liter of water whereby the narcotine salt precipitated.

The narcotine salt was isolated by filtration and washed with about 1.5 liters of cold water. Then the salt was suspended in about 1.5 liters of water, treated with 60 grams of solid soda and stirred overnight. The precipitated narcotine was filtered by suction and washed with about 1 liter of water. The filtrate was adjusted to pH 5 with glacial acetic acid and evaporated to about 455 cc. under reduced pressure. The mixture was precipitated with 3 liters of methanol containing 30 grams of sodium acetate. This procedure was then repeated once more. After drying under reduced pressure, the chitosan polysulfuric acid ester was obtained as a white powder, sulfur content 15.1%, $[\eta]=0.072$ (in 0.5 N NaCl), total nitrogen 3.39%, Van Slyke nitrogen 1.20%, formyl 3.2%.

*Example 2*

90 grams of chitosan formate, prepared according to the procedure described in Example 1, were triturated with formamide until a paste was formed. This material was then dissolved by the addition of a total of 900 cc. of formamide at 50° C. while stirring. Small, undissolved clumps were filtered off. The mixture was then sulfated by the addition of 180 cc. of chlorosulfonic acid according to the procedure described in the preceding example. The chitosan polysulfuric acid ester obtained had a sulfur content of 12.6%, $[\eta]=0.315$ (in 0.5 N NaCl), total nitrogen 3.05%, Van Slyke nitrogen 0.5%, formyl 6%.

*Example 3*

50 grams of chitosan were suspended in about 1200 cc. of water and treated while stirring with about 30 cc. of concentrated hydrochloric acid whereby a highly viscous solution was obtained. This solution was precipitated with about 3 liters of acetone. The precipitated chitosan hydrochloride was filtered, washed with acetone and dried.

10 grams of the chitosan hydrochloride were introduced into 60 cc. of formamide and warmed to 70° C. This solution was introduced into a mixture of 90 cc. of pyridine and 30 cc. of chlorosulfonic acid fused at 70° C. The temperature rose to 85° C. During the decomposition of the formamide there was an evolution of gas. The mixture was stirred for 2 hours at 90° C. The chitosan polysulfuric acid ester was isolated in the same manner as described in Example 1. Sulfur content 14.8%, $[\eta]=0.270$ (in 0.5 N NaCl), total nitrogen 4.26%, Van Slyke nitrogen 0.16%, formyl 6%.

Example 4

5 grams of chitosan polysulfuric acid ester ($[\eta]=0.315$ in 0.5 N NaCl) produced as described in Example 2, were dissolved in 47.4 cc. of water. This solution was warmed to 70° C. and treated with 1.75 cc. of concentrated hydrochloric acid. After 330 minutes, the degraded solution was neutralized with caustic soda solution, concentrated and precipitated with methanol. The viscosity of the product was reduced to $[\eta]=0.135$ (in 0.5 N NaCl).

Example 5

2 grams of chitosan polysulfuric acid ester ($[\eta]=0.315$ as in Example 2) were dissolved in 20 cc. of water and treated with 0.3 cc. of 30% peroxide. The mixture was heated for about 1 hour at 90° C. The reaction was then completed and the peroxide was consumed. The mixture was filtered and the solution was evaporated under reduced pressure to about 10 cc. The concentrate was precipitated with methanol and a product was obtained having $[\eta]=0.150$ (in 0.5 N NaCl).

Example 6

5 grams of chitosan hydrochloride were dissolved in 75 cc. of formamide on the steam bath and then cooled with ice water to 5–10° C. 15 cc. of chlorosulfonic acid were slowly dropped in. The mixture was stirred for 24 hours at room temperature. The product was isolated according to the procedure described in Example 1, $[\eta]=0.245$, sulfur content 16.24%, total nitrogen 3.58%, Van Slyke nitrogen 2.90%.

Example 7

340 grams of non-degraded chitosan formate were introduced into 5.8 liters of formamide. The mixture was stirred for 24 hours at room temperature and an additional 5 hours at 60° C. The highly viscous solution thus obtained was introduced into a melt of 680 cc. of chlorosulfonic acid and 2040 cc. of pyridine and sulfated at 90° C. for 4 hours. The polysulfuric acid ester thus obtained was isolated according to the procedure described in Example 1, sulfur content 12.7%, $[\eta]=0.48$ (in 0.5 N NaCl), total nitrogen 4.34%, Van Slyke nitrogen 0.07%, formyl 8.7%.

I claim:

1. A method of producing N-formyl chitosan polysulfuric acid esters which comprises converting chitosan into a salt thereof, dissolving the salt in formamide and sulfating the solution by treatment with chlorosulfonic acid.

2. A method according to claim 1 wherein the chitosan salt is sulfated with chlorosulfonic acid in the presence of pyridine.

3. A method according to claim 1 wherein chitosan is converted into a salt which is a member of the group consisting of chitosan hydrochloride, chitosan hydrobromide, chitosan formate, chitosan acetate, chitosan perchlorate and chitosan nitrate.

4. A method of producing N-formyl chitosan polysulfuric acid esters which comprises converting chitosan into a salt thereof, partially degrading the salt of chitosan, and sulfating the partially degraded chitosan salt with chlorosulfonic acid in formamide.

5. A method according to claim 4 wherein the partial degradation of the chitosan salt is effected with aqueous hydrogen peroxide.

6. A method of producing N-formyl chitosan polysulfuric acid esters which comprises converting chitosan into a salt thereof, sulfating the chitosan salt with chlorosulfonic acid in formamide and partially degrading the chitosan polysulfuric acid ester.

7. A method according to claim 6 wherein the degradation is effected by hydrolysis.

8. A method according to claim 6 wherein the degradation is effected by means of aqueous hydrogen peroxide.

9. A method of producing N-formyl chitosan polysulfuric acid esters which comprises converting chitosan into a salt which is a member of the group consisting of chitosan hydrochloride, chitosan hydrobromide, chitosan formate, chitosan acetate, chitosan perchlorate and chitosan nitrate, partially degrading the chitosan salt by treatment with aqueous hydrogen peroxide, sulfating the partially degraded product by treatment with chlorosulfonic acid in formamide solution, purifying the product thus obtained by forming an alkaloid salt thereof, and treating the alkaloid salt with an alkali solution.

10. Chitosan polysulfuric acid esters having an N-formyl content of 1.5 to 9%.

11. A method according to claim 9 wherein the chitosan is derived from chitin by fusion with alkali and the chitosan salt is chitosan formate.

12. A method of producing N-formyl chitosan polysulfuric acid esters which comprises sulfating chitosan formate in formamide with chlorosulfonic acid in the presence of pyridine.

13. A process of producing N-formyl chitosan polysulfuric acid esters which comprises deacetylating chitin with fused alkali, converting the chitosan thus formed to a salt thereof, dissolving the chitosan in formamide and sulfating the solution with chlorosulfonic acid.

References Cited in the file of this patent

UNITED STATES PATENTS

| | | |
|---|---|---|
| 2,040,879 | Rigby | May 19, 1936 |
| 2,201,762 | Cupery | May 21, 1940 |
| 2,508,433 | Snyder | May 30, 1950 |
| 2,612,499 | Pulver | Sept. 30, 1952 |
| 2,689,244 | Jones | Sept. 14, 1954 |

OTHER REFERENCES

Cushing et al.: J. Am. Chem. Soc., vol. 76, page 4590 (Sept. 20, 1954).